United States Patent [19]
Peiffer et al.

[11] Patent Number: 5,955,181
[45] Date of Patent: Sep. 21, 1999

[54] HEAT-SEALABLE POLYESTER FILM

[75] Inventors: Herbert Peiffer, Mainz; Cynthia Bennett, Alzey; Werner Roth, Eppstein; Karsten Fritsch, Schwabmünchen, all of Germany

[73] Assignee: Hoechst Diafoil GmbH, Wiesbaden, Germany

[21] Appl. No.: 08/988,315

[22] Filed: Dec. 10, 1997

[51] Int. Cl.[6] ............... B32B 7/02; B32B 27/08; B32B 27/36; B32B 31/30

[52] U.S. Cl. ............... 428/212; 428/346; 428/347; 428/349; 428/354; 428/480; 428/910; 264/173.12; 264/173.15; 264/173.16; 264/290.2

[58] Field of Search ............... 428/212, 346, 428/347, 349, 354, 480, 910; 264/173.12, 173.15, 173.16, 290.2

[56] References Cited

FOREIGN PATENT DOCUMENTS

| | | |
|---|---|---|
| A-0-035 835 | 9/1981 | European Pat. Off. . |
| A-0-432 886 | 6/1991 | European Pat. Off. . |
| A-0-515 096 | 11/1992 | European Pat. Off. . |
| A-1-465 973 | 1/1974 | United Kingdom . |

OTHER PUBLICATIONS

Plastics Technology, May 1995 "Get Ready for PEN Blow Molding".

*Primary Examiner*—Vivian Chen

[57] ABSTRACT

The invention relates to a coextruded heat-sealable polyester film having at least one base layer and at least one heat-sealable outer layer, wherein this heat-sealable outer layer comprises a copolymer which contains from 5 to 95% by weight of ethylene 2,6-naphthalate units.

17 Claims, No Drawings

HEAT-SEALABLE POLYESTER FILM

BACKGROUND OF THE INVENTION

1) Field of the Invention

The invention relates to a transparent heat-sealable, biaxially oriented polyester film having at least one heat-sealable layer of copolyester which contains ethylene 2,6-naphthalate units, to the use thereof and to a process for the production thereof.

2) Prior Art

Because of their advantageous physical properties, biaxially oriented polyester films have a wide variety of applications, e.g. as support for magnetic tapes or as dielectric for capacitors. Because they are effective barriers to oxygen and have good optical properties, polyester films are suitable as packaging material. For many of the packaging applications, it is desirable for the films to be heat-sealable and have a high seal seam strength, even at low sealing temperatures. A further requirement of such films is that they can be produced cost-effectively and without significant problems and that they can easily be further processed.

In the prior art, the materials used for the heat-sealable layers of heat-sealable polyester films are either

- crystalline or partially crystalline, with a low melting point (e.g. polyethylene, propylene homopolymer or copolymers of ethylene and propylene) or
- amorphous, with a glass transition temperature $T_g$, measured by DSC, which is lower than that of the associated base layer.

Polyester films which are produced by the first-named method have the advantage of a low sealing temperature. The minimum sealing temperature (also termed sealing initiation temperature) of such films is about 100° C., making the films extremely suitable for processing on high-speed packaging machines. A disadvantage of these films, however, is that the heat-sealable layers/films have to be applied to the polyester film by lamination using adhesion promoters. This additional process step raises costs and in some circumstances may be uneconomic. In addition, the optics of such bonded materials are unsatisfactory. A further disadvantage is that the polyethylene of the heat-sealable layer generally contains lubricants, such as erucamide. When the film is reeled, the erucamide may be transferred onto the opposite surface of the polyester film and thus make this side unsuitable for subsequent metalizing.

In heat-sealable polyester films which are produced by the second method, the amorphous heat-sealable layers can be applied onto the base layer of polyester by means of coextrusion. This method is more cost effective than lamination. The amorphous heat-sealable coextruded layers generally consist of copolyesters containing isophthalic acid and terephthalic acid, as described, for example, in GB-A 1 465 973 and EP-A 0 035 835.

GB-A 1 465 973 describes a coextruded polyester film having two layers, one layer of which consists of copolyesters containing isophthalic acid and terephthalic acid and the other layer of which consists of polyethylene terephthalate. The patent gives no useful indications concerning the sealing performance of the film. The lack of pigmentation means that the film cannot be produced by a reliable process (the film cannot be wound up) and that the possibilities for further processing of the film are limited.

EP-A 0 035 835 describes a coextruded heat-sealable polyester film where, in the heat-sealable layer, particles whose mean size exceeds the heat-sealable layer thickness are added in order to improve winding and processing performance. The particulate additives form surface protrusions which prevent undesired blocking and sticking to rolls and guides. The choice of particles having diameters greater than the heat-sealable layer thickness impairs the sealing performance. The patent does not give an indication of the sealing temperature range of the film. The seal seam strength is measured at 140° C. and is in a range from 85 to 120 N/m (from 1.275 N/15 mm to 1.8 N/15 mm film width).

EP 0 432 886 describes a coextruded multilayer polyester film which has a first layer on which is arranged a heat-sealable layer and a second layer on which is arranged an acrylate layer. The heat-sealable outer layers here may also consist of copolyesters containing isophthalic acid and terephthalic acid. The coating on the reverse side gives the film improved processing performance. The patent gives no indication of the sealing temperature range of the film. The seal seam strength is measured at 140° C. For a heat-sealable layer thickness of 11 μm, a seal seam strength of 761.5 N/m (11.4 N/1 5 mm) is given.

EP 0 515 096 describes a coextruded multilayer heat-sealable polyester film which contains a further additive in the sealable layer. The additive may, for example, contain inorganic particles and is preferably distributed onto the film during its production, in an aqueous layer. By this method, the film is claimed to retain its good sealing properties and to be easy to process. The patent gives no indication of the sealing temperature range of the film. The seal seam strength is measured at 140° C. and is more than 200 N/m (3 N/15 mm). For a heat-sealable layer of 3 μm thickness, a seal seam strength of 275 N/m (4.125 N/15 mm) is given.

A data sheet on Melinex® 850 (IC), a copolyester-coated polyester film, gives a sealing temperature range of from 120 to 200° C. for this film, the seal seam strength being 4.8 N/15 mm (measured at a sealing temperature of 140° C., a sealing pressure of 2.8 bar and a sealing time of 2 sec). A disadvantage of this film is its relatively high sealing temperature and its low seal seam strength, in particular when short sealing times and low sealing pressures are used.

In comparison with non-heat-sealable polyester films, heat-sealable polyester films have, inter alia, inferior optical properties and slip properties, especially at elevated temperatures.

In comparison with non-heat-sealable polyester films, the production and processing of heat-sealable polyester films is clearly inferior when their sealing-layer copolymers have a glass transition temperature lower than that of the base layer. Because of the lower glass transition temperature, the heat-sealable surface of the film tends to block and stick during production and during processing. Problems in the production process and in the conversion process occur significantly more frequently than with a non-heat-sealable standard polyester film. Thus, for example, during longitudinal stretching in film production, heated rolls heat the amorphous film to a temperature which is somewhat higher than the glass transition temperature of the base layer. The heat-sealable layer, which has a lower glass transition temperature than that of the base layer, is already tacky at this temperature. For this reason, there are more film breaks and/or complete production stoppages during longitudinal stretching of heat-sealable polyester films. The method using the abovementioned raw materials for the film is therefore restricted in application. Printing or metalizing of the film are similarly affected. In both processes, the film is heated and therefore the tendency of the film to stick, for example to guiding rolls or during winding, is greatly increased.

It is known that copolymers of polyethylene terephthalate and polyethylene 2,6-naphthalate form an amorphous phase in the range from about 15 to 85% by weight of polyethylene 2,6-naphthalate as a proportion of the entire mixture (Plastics Technology, May 1995). There is no indication in this publication that these amorphous copolymers can be used for producing heat-sealable polyester films, in particular for producing heat-sealable polyester films having a low sealing initiation temperature. A person skilled in the art would not expect that copolymers of this type would give heat-sealable polyester films, since the glass transition temperature $T_g$ of these copolymers is higher than that of those of the PET base layer. Rather, these facts would deter the person skilled in the art from using such polymers to produce heat-sealable films.

SUMMARY OF THE INVENTION

It is an object of the present invention to provide a heat-sealable, biaxially oriented polyester film which does not have the disadvantages of the abovementioned films of the prior art and which, in particular, is distinguished by easy production and further processing and also by very good heat-sealing capability. A particular concern of the invention was to reduce significantly or avoid the tendency of heat-sealable polyester films to stick during production and further processing. Besides this, optical properties should also be improved in comparison with heat-sealable films of the prior art. From a production engineering point of view, the films should be easier to produce than was previously the case. It should also be ensured that during extrusion of the films it is possible to reintroduce recycled material (i.e. the cut film scrap arising during production) at a concentration of from 10 to 50% by weight, based on the total weight of the film, without this having any significant negative effect on their advantageous properties.

Such films would be extremely suitable for packaging applications, especially where the films are used at low sealing temperatures on high-speed packaging machines.

The object is achieved according to the invention by providing a coextruded, biaxially oriented, heat-sealable polyester film having at least one base layer and at least one heat-sealable outer layer, wherein the heat-sealable outer layer(s) is/are a copolymer which contain(s) from 5 to 95% by weight of ethylene 2,6-naphthalate units.

The objective can also be achieved by providing a process ("direct extrusion of the outer layer") for producing the novel film in which the pellets of polyethylene terephthalate and polyethylene 2,6-naphthalate are fed, in the desired mixing ratio, directly to the extruder for the heat-sealable layer (A) of the film. The two materials are extruded at about 300° C. and with a residence time in the extruder of about 5 min. The melt is screened, extruded through a coextrusion die to give a flat melt film, and laid onto the base layer (B). The multilayer film (layer sequence for example A-B or A-B-A) is ejected over the die lip and solidified on a chill roll. The remaining process steps are as indicated at a later stage herein. The copolymer forms in the extruder under the stated conditions.

A great advantage here is that the extruder is fed with pellets which are crystalline and therefore do not adhere to the walls.

According to the invention, the film has at least two layers, the layers including a base layer B and the heat-sealable outer layer A. In a preferred embodiment, the film has heat-sealable outer layers A according to the invention on both sides of its base layer B.

DESCRIPTION OF THE PREFERRED EMBODIMENTS

The base layer of the film consists of a thermoplastic polyester, in particular one which comprises predominantly, i.e. to an extent of at least 80% by weight, preferably at least 90% by weight, polyethylene terephthalate (PET), polyethylene 2,6-naphthalate (PEN), poly-1,4-dicyclohexanedimethylene terephthalate (PCT) or polyethylene 2,6-naphthalate-bibenzoate (PENBB). Preference is given to polyesters which are built up essentially from ethylene terephthalate or ethylene 2,6-naphthalate units and/or up to 10 mol %, preferably up to 5 mol % of comonomer units, where the glycol and/or the dicarboxylic acid component of the comonomer units may vary. The glycol for the comonomer can be a dihydric diol, such as diethylene glycol, triethylene glycol, an aliphatic glycol of the formula HO-$(CH_2)_n$-OH, where n=from 3 to 6, a branched aliphatic glycol having up to 6 carbon atoms or an aromatic glycol of the formulae

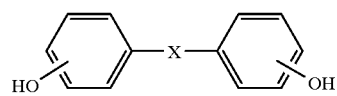

where X=—$CH_2$—, $C(CH_3)_2$—, —O—, —$C(CF_3)_2$—, —S—, —$SO_2$— and

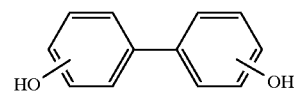

The dicarboxylic acid comonomer can be a dicarboxylic acid or an ester derived therefrom, for example a dicarboxylic acid of the following formulae:

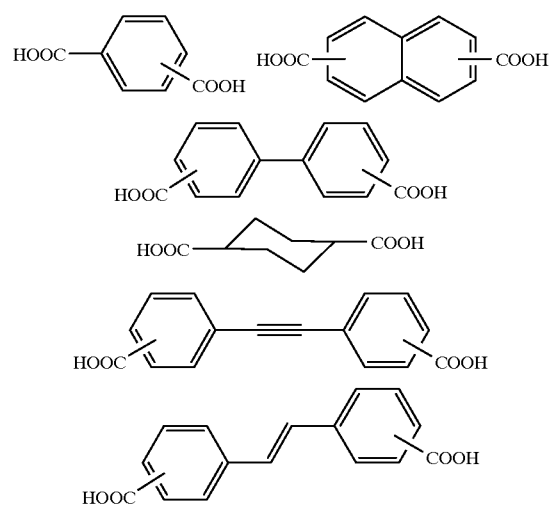

or a $C_{1-6}$-alkyldicarboxylic acid.

The polyesters may be prepared from either the dicarboxylic acid esters, using the transesterification process with the usual transesterification catalysts, such as zinc salts, calcium salts, lithium salts and manganese salts, followed by stabilization and polycondensation with conventional polycondensation catalysts, such as antimony trioxide or organic titanium alkoxides and/or titanium carboxylates, or dicarboxylic acids, using the direct esterification process and conventional polycondensation catalysts (for example antimony trioxide or organic titanium compounds of the alkoxide and/or carboxylate type, if desired also containing other cations).

The heat-sealable outer layers of the novel film consist of copolymers which contain ethylene 2,6-naphthalate units and ethylene terephthalate units. Up to 10 mol % of the copolymers may be made up of other comonomers, as given above for the polyesters of the base layer. The weight ratio of the ethylene 2,6-naphthalate units to the ethylene terephthalate units is from 5/95 to 95/5, preferably from 10/90 to 90/10, very particularly preferably from 15/85 to 85/15.

For processing the polymers, it has proven advantageous if the melts for the outer layer(s) and the base layer do not differ very greatly in their viscosities, otherwise the flow may be disturbed or streaks may form on the finished film.

A modified solution viscosity (SV) is used to describe the viscosity ranges of the two melts. For commercially available polyethylene terephthalates (PET), which are processed to give biaxially oriented films and are used according to the invention as material for the base film, the SV is in the range from 600 to 1000. To ensure that the novel heat-sealable film is of satisfactory quality, the SV of the copolymers should be in the range from 500 to 1200. If required, a solid phase condensation can be carried out on the respective pellets in order to match the SV of the materials to one another.

The outer layer materials can be prepared in three different ways:

a) copolycondensation

In copolycondensation, the terephthalate and the naphthalate monomers are placed, together with glycol, in a reaction vessel and polycondensed to give a polyester, using the usual catalysts and stabilizers. A random distribution of the terephthalate and naphthalate units in the polyester is to be expected as a result of this process.

b) premixing of the melts

PET and PEN homopolymers are melted and mixed together in the desired ratio, either in a reaction vessel or preferably in a melt compounder (e.g. a twin-screw compounder) or extruder. Immediately after melting, transesterification reactions between the polyesters begin to take place. This initially gives block copolymers, but with increasing reaction time, and depending on the temperature and the mixing action of the stirrer, the blocks become smaller and after a lengthy reaction time a random copolymer is obtained. It is, however, not necessary, nor is it always advantageous, to wait until a random distribution has become established, since the desired properties are also given by block copolymers. The resultant copolymer is then extruded via a die and pelletized.

c) direct extrusion

The PET and PEN homopolymers are mixed as pellets in the desired ratio and fed in this form to the extruder for the outer layer. The transesterification to give the copolymer takes place here directly during the production of the film. This process has the advantage of being very cost effective. This process is generally expected to give block copolymers, the block lengths being dependent on the extrusion temperature, the mixing action of the extruder and the residence time in the melt.

In a preferred embodiment of the invention, the base layer contains from 0.1 to 15% by weight of the copolymers of the outer layers. These are either added to the base layer directly during extrusion or are in any case present in the film as a result of adding recycled material. The proportion of these copolymers in the base layer is selected so that the base layer has crystalline character.

Surprisingly, the use of copolymers of PET and PEN gave a heat-sealable outer layer having a sealing initiation temperature of below 120° C. This is surprising because, in contrast to the prior art, the glass transition temperature $T_g$ for the copolymer of the heat-sealable layer(s) is higher than the glass transition temperature $T_g$ of the base layer (cf. for example Plastics Technology, May 1995). The glass transition temperature of the copolymer used according to the invention for the heat-sealable layer is in the range from 80 to 100° C., whereas in heat-sealable layers of the prior art the glass transition temperature is in some cases far below the glass transition temperature $T_g$ of the base layer ($T_g$ of the base layer: about 80° C.).

Glass transitions which are measured in the first heating procedure on biaxially oriented, heat-set films (termed $T_g1$ below) are, because of the crystallinity and the molecular stresses in the amorphous fraction of the specimens, of relatively small extent and are distributed across a wide temperature range and shifted to relatively high temperatures. Because of orientation effects, in particular, they should not be used to characterize the properties of a particular polymer. The glass transition in the first heating procedure ($T_g1$) of the individual layers of a coextruded film is, because of orientation and crystallinity, small and "blurred" and is often undetectable at the resolution of DSC measuring apparatus. If, on the other hand, the specimens are melted and then rapidly quenched to below their glass transition temperature, the orientation effects are eliminated, and when heating is resumed it is possible to measure glass transitions ($T_g2$) which have greater intensity and are characteristic of the polymers used. However, with this method it is also rather unlikely that the glass transitions of the individual layers can be distinguished, since the coextruded layers mix and transesterify with one another when they melt. It is, however, entirely sufficient to compare the glass transitions $T_g2$ of the entire coextruded films with the glass transition $T_g2$ of the polymer which was used for the base layer. If the $T_g2$ of the coextruded film is lower than that of the base layer, then the glass transition temperature of the outer layer is also lower than that of the base layer. If the $T_g2$ of the coextruded film is higher than that of the base layer, then the glass transition temperature of the outer layer is higher than that of the base layer.

The base layer and the outer layer(s) may, if necessary, also contain conventional additives, such as stabilizers and antiblocking agents, in the usual amounts.

Examples of compounds used as stabilizers are phosphorus compounds, such as phosphoric acid and various phosphoric esters.

Examples of typical antiblocking agents are inorganic and/or organic particles made from calcium carbonate, amorphous silicas, talc, magnesium carbonate, barium carbonate, calcium sulfate, barium sulfate, lithium phosphate, calcium phosphate, magnesium phosphate, alumina, LiF, the calcium, barium, zinc and manganese salts of the dicarboxylic acids used, carbon black, titanium dioxide, kaolin and crosslinked polystyrene particles or acrylate particles. The particles may also be mixtures of two or more of the abovementioned particle types or they may be mixtures of the same particle type but of a different particle size. The particles are added to the individual layers in the usual concentrations, e.g. in the form of glycol dispersion during the polycondensation or as master batches during extrusion. The usual pigment concentrations are from 0.0001 to 5% by weight.

To establish other desired properties, the film may be coated or treated using corona, plasma or flame. Typical coatings are layers which promote adhesion, have an antistatic effect, improve slip or reduce adhesion. These additional layers may be applied to the film by in-line coating, for example using aqueous dispersions before the transverse stretching step.

The novel film comprises at least the base layer described above and at least one heat-sealable outer layer. Depending on its intended application, the film may have a further outer layer on the opposite side. If desired, an intermediate layer or layers may be applied to one or both sides between the base layer and the outer layer(s).

Preferred embodiments of the novel polyester film have three layers. The construction, thickness and formulation of a second outer layer may be selected independently of the outer layer which already exists, and the second outer layer may likewise comprise one of the polymers or polymer mixtures described above, which need not, however, be identical with that of the first outer layer. The second outer layer may, however, also comprise other commonly encountered outer layer polymers.

The thickness of the outer layer(s) is generally greater than 0.1 $\mu$m and is preferably in the range from 0.2 to 3 $\mu$m, in particular from 0.3 to 2.5 $\mu$m, the outer layers being of identical or different thickness.

The intermediate layer(s) may consist of the polymers described for the base layer. In a particularly preferred embodiment, the intermediate layer(s) consist(s) of the polyester raw materials described for the base layer. The intermediate layer(s) may contain the usual additives described for the individual layers.

The thickness of the intermediate layer(s) is generally greater than 0.3 $\mu$m and is preferably in the range from 0.5 to 15 $\mu$m, in particular from 1.0 to 10 $\mu$m.

The total thickness of the novel polyester film can vary within wide limits and depends on its intended use. It is preferably from 4 to 100 $\mu$m, in particular from 5 to 50 $\mu$m, preferably from 6 to 30 $\mu$m, the base layer making up from about 40 to 100% of the total thickness of the film.

The invention also provides a process for producing the novel polyester film.

For this process, the melt(s) corresponding to the film layer or the individual layers of the film is/are coextruded through a flat film die, the resultant film is solidified by drawing off on one or more rolls, the film is then biaxially stretched (oriented) and the biaxially stretched film is heat-set and, if desired, corona- or flame-treated on the surface layer which is to be treated.

The biaxial stretching (orientation) is generally carried out sequentially, preference being given to sequential biaxial stretching in which longitudinal stretching (in the machine direction) precedes transverse stretching (perpendicular to the machine direction).

In the coextrusion process, the polymer or polymer mixture of the individual layers is firstly compressed and plasticized in an extruder; for this, any additives used may already be included in the polymer or polymer mixture. The melts are then pressed simultaneously through a flat film die, and the extruded multilayer film is drawn off on one or more take-off rolls and thus cools and solidifies.

The resultant film is then stretched longitudinally and transversely to the extrusion direction, causing orientation of the molecular chains. The longitudinal stretching is advantageously carried out using two rolls running at different speeds which correspond to the desired stretching ratio, and the transverse stretching is advantageously carried out using an appropriate tenter frame. The longitudinal stretching ratios are in the range from 2.5 to 6, preferably from 3 to 5.5. The transverse stretching ratios are in the range from 3.0 to 5.0, preferably from 3.5 to 4.5.

Biaxial stretching of the film is followed by heat setting during which the film is held for from about 0.1 to 10 s at a temperature of from 150 to 250° C. The film is then reeled using winding equipment in the usual manner.

The temperatures at which longitudinal and transverse stretching are carried out can vary within a relatively wide range and depend on the desired film properties. The longitudinal stretching is generally carried out at from 80 to 130° C., and the transverse stretching preferably at from 90 to 150° C.

After the biaxial stretching, one or both surfaces of the film is/are preferably corona- or flame-treated by one of the known methods. The intensity of the treatment is generally in the range above 45 mN/m.

The novel film is distinguished by excellent ease of production and excellent ease of further processing. Because of the materials used, the extrusion and in particular the longitudinal stretching are reliable processes. There is no sticking of the film to the roll surfaces used for longitudinal stretching, as can occur with films of the prior art. The novel film furthermore has excellent heat-sealing capability and very good optical properties. The gloss and haze of the film have been significantly improved. In addition it has been ensured that during extrusion of the film it is possible to reintroduce recycled material at a concentration of from 20 to 50% by weight, based on the total weight of the film, without any significant adverse effect on the physical properties of the film.

Thus the film has excellent suitability for packaging applications, especially where it is used at a low sealing temperature on high-speed packaging machines.

It has also been found that the layer(s) containing amorphous ethylene 2,6-naphthalate units is/are very easy to emboss (e.g. using an embossing roll) at temperatures from >90 to 100° C. The novel film is therefore not only suitable for heat-sealing applications, but is also highly suitable for the transfer of embossed textures to the amorphous layer according to the invention. A typical example for this is found in holographic applications, in which geometric patterns are introduced by an embossing roll into the amorphous layer and, after subsequent metalization, give the film very attractive decorative effects.

The following parameters were used for characterization of the raw materials and the films:

SV (solution viscosity)

The SV was determined by dissolving a polyester specimen in a solvent (dichloroacetic acid). The viscosity of this solution and the viscosity of the pure solvent were measured in an Ubbelohde viscometer. The quotient of the two values is calculated, 1000 is deducted from this figure, and the resulting figure is multiplied by 1000 to give the SV (solution viscosity).

Determination of heat-sealing capability

The sealing jaws of the Brugger HSG/ET sealing apparatus were set at 190° C. The film specimens were sealed at a sealing pressure of 10 N/cm$^2$ and a sealing time of 0.5 s. Test strips of width 15 mm were cut from the sealed specimens. The T-seal seam strength, i.e. the force required to separate the test strips, was determined at 200 mm/min separation velocity on a tensile test machine, the plane of the sealed seam being perpendicular to the direction of traction. The films were classified as "heat-sealable" if the seal seam strength was at least 0.5 N/15 mm.

Determination of the minimum sealing temperature (sealing initiation temperature)

Using the Brugger HST/ET sealing apparatus, heat-sealed specimens (seal seam 20 mm×100 mm) were produced by sealing a film at various temperatures using two heated sealing jaws, at a sealing pressure of 10 N/cm² and a sealing time of 0.5 s. Test strips of 15 mm width were cut from the sealed specimens. The T-seal seam strength was measured as in the determination of the seal seam strength. The minimum sealing temperature is the temperature at which a seal seam strength of at least 0.5 N/15 mm is achieved.

Seal seam strength

For this determination, two film strips of 15 mm width were laid one on top of the other and sealed together at 130° C., using a sealing time of 0.5 s and a sealing pressure of 1.5 N/mm² (apparatus: Brugger NDS, sealing jaw heated on one side). The seal seam strength was determined by the T-peel method.

Friction

Friction was determined according to DIN 53 375. The coefficient of sliding friction was measured 14 days after production.

Surface tension

Surface tension was measured using the "ink method" (DIN 53 364).

Haze

The Hölz haze was determined by a method based on ASTM-D 1003-52, but in order to utilize the most effective measurement range measurements were made on four pieces of the film laid one on top of the other, and a 1" slit was used instead of a 4" pinhole.

Gloss

Gloss was measured according to DIN 67 530. The reflectance was measured as a characteristic optical value for a film surface. Based on the standards ASTM-D 523-78 and ISO 2813, the angle of incidence was set at 20" or 60". A beam of light hits the flat test surface at the set angle of incidence and is reflected and/or scattered thereby. A proportional electrical variable is displayed, representing the light beams hitting the photoelectric detector. The value measured is dimensionless and is stated together with the angle of incidence.

Glass transition temperatures $T_g1$ and $T_g2$

The film specimens were studied by DSC (differential scanning calorimetry), using a Du Pont DSC 1090. The heating rate was 20 K/min and the specimen weight was about 12 mg. In the first heating procedure, the glass transition temperature $T_g1$ was determined. The samples often gave an enthalpy relaxation (a peak) at the beginning of the stepped glass transition. The temperature taken as $T_g1$ was that at which the stepped change in heat capacity—without reference to the peak-shaped enthalpy relaxation—achieved half of its height in the first heating procedure. In all cases there was only a single glass transition stage in the thermogram in the first heating procedure. In order to eliminate any effect of their thermal history, the specimens were held at 300° C. for 5 minutes after heating, and then quenched in liquid nitrogen. The temperature for the glass transition $T_g2$ was taken as the temperature at which the transition reached half of its height in the thermogram for the second heating procedure.

The copolymers used in the examples for film production can be prepared by the processes described previously. Further practical details of the three processes are given below by means of examples:

EXAMPLE 1

The copolymer was prepared by copolycondensation. For this, the monomers dimethyl terephthalate and 2,6-dimethyl naphthalene-dicarboxylate were mixed in a reactor in a molar ratio of 1.26:1.00 (corresponding to a composition of 50% by weight of ethylene terephthalate units and 50% by weight of ethylene 2,6-naphthalate units in the final copolymer), and then mixed with ethylene glycol and, as catalyst, 300 ppm of manganese acetate. The transesterification was carried out with stirring at from 160 to 250° C., at atmospheric pressure, and methanol was distilled off during this process. An equimolar amount of phosphoric acid as stabilizer and 400 ppm of antimony trioxide as catalyst were then added. The polycondensation was carried out with stirring at 280° C. and a pressure of less than 1 mbar. It was possible to determine, and thus control, the molecular weight by measuring the torque on the stirrer. After the reaction, nitrogen was used to discharge the melt, which was then pelletized.

EXAMPLE 2

Commercially available polyethylene terephthalate pellets and polyethylene 2,6-naphthalate pellets were used. In each case, the pellets were crystallized and dried for about 4 h at a temperature of about 160° C. 50% by weight of each of the two materials was then placed in a mixer, and the materials were homogenized by stirring. The mixture was then passed to a twin-screw compounder (ZSK from Werner and Pfleiderer, Stuttgart) and extruded there at a temperature of about 300° C., with a residence time of about 3 min. The extruded melt was chopped to give pellets by reaction between the polyethylene terephthalate and polyethylene 2,6-naphthalate.

EXAMPLE 3

In contrast to Example 2, the pellets of polyethylene terephthalate and those of polyethylene 2,6-naphthalate were fed, in a mixing ratio of 1/1, directly to the single-screw extruder for film production. The two materials were extruded there at about 300° C. The melt was screened, shaped in a coextrusion die to give a flat film and, as layer A, laid onto the base layer B. The coextruded film was discharged through the die lip and solidified on a chill roll. The residence time of the two polymers in the extrusion process was about 5 min. The other process steps were as given above. Here, too, the copolymer was formed during the extrusion process under the stated conditions.

Film production

EXAMPLE 4

Polyethylene terephthalate pellets were dried at 160° C. to a residual moisture of 50 ppm and fed to the extruder for the base layer A.

In addition, pellets of polyethylene terephthalate and polyethylene 2,6-naphthalate (in a weight ratio of 1/1) were likewise dried at 160° C. to a residual moisture of 50 ppm and fed to the two extruders for the outer layers B. The extruder conditions for the outer layers B were as described in Example 3.

Coextrusion followed by stepwise orientation in the longitudinal and transverse directions, gave a transparent three-layer film which had a symmetrical construction and a total thickness of 12 μm. Each of the outer layers had a thickness of 1.5 μm.

| Base layer A: | |
|---|---|
| 95% by weight | of polyethylene terephthalate RT 49 from Hoechst AG, having an SV of 800 |
| 5% by weight | of master batch made from 99% by weight of polyethylene terephthalate and 1.0% by weight of $SiO_2$ (Sylobloc 44 H) having a mean particle size of 4.5 μm |
| Outer layer B: | |
| 50% by weight | of polyethylene 2,6-naphthalate: Polyclear N 100 prepolymer (Hoechst AG) having SV of 1000 |
| 40% by weight | of polyethylene terephthalate RT 49 (Hoechst AG) having an SV of 800 |
| 10% byweight | of master batch made from 99.0% by weight of polyethylene terephtatate and 1.0% by weight of $SiO_2$ (Syloblock 44 H), having a mean particle size of 1.0 μm |

The production conditions for the individual process steps were:

| Extrusion: | |
|---|---|
| Temperatures | |
| Layer A: | 300° C. |
| Layer B | 300° C. |
| Temperature of the take-off roll: | 30° C. |
| Die width: | 1 mm |
| Temperature of the take-off roll: | 300° C. |
| Longitudinal stretching: temperature: | 85–135° C. |
| longitudinal stretching ratio: | 4.0 |
| Transverse stretching: temperature: | 85–145° C. |
| transverse stretching ratio: | 4.0 |
| Heat setting: temperature | 230° C. |

The film was heat-sealable. The properties of films produced in this way are given in Table 2.

EXAMPLE 5

A coextruded film was produced using the formulation of Example 4, except that the outer layers B had the following composition:

| 70% by weight | of polyethylene 2,6-naphthalate: Polyclear N 100 prepolymer (Hoechst AG) having an SV of 1000 |
|---|---|
| 20% by weight | of polyethylene terephtalate RT 49 (Hoechst AG) having an SV of 800 |
| 10% by weight | of master batch made from 99.0% by weight of polyethylene terephtalate and 1.0% by weight of $SiO_2$ (Syloblock 44 H), having a mean particle size of 1.0 μm |

The film was produced as in Example 4 and was heat-sealable.

EXAMPLE 6

A coextruded film was produced using the formulation of Example 4, except that the outer layers B now have the following composition:

| 90% by weight | of polyethylene 2,6-naphthalate: Polyclear N 100 prepolymer (Hoechst AG) having an SV of 1000 |
|---|---|
| 10% by weight | of master batch made from 99.0% by weight of polyethylene terephtalate and 1.0% by weight of $SiO_2$ (Sylobloc 44 H), having a mean particle size of 1.0 μm |

The film was produced as in Example 4 and was heat-sealable.

EXAMPLE 7

A coextruded film was produced similarly to Example 4, but the copolymer for the outer layers was produced as in Example 2. All other conditions were as stated for Example 4.

EXAMPLE 8

A coextruded film was produced similarly to Example 4, but the copolymer for the outer layers was produced as in Example 1. All other conditions were as stated for Example 4.

EXAMPLE 9

A coextruded film was produced similarly to Example 4, but the film thickness was increased from 12 to 19 μm, and, at the same time, the thickness of the heat-sealable layer was increased from 1.2 to 2.0 μm. All other parameters remained unchanged.

EXAMPLE 10

A coextruded film was produced similarly to Example 4, but coextrusion was used to produce a three-layer ABC film having a total thickness of 12 μm, the heat-sealable layer A and the other outer layer C each having a thickness of 2 μm.

| Base layer B: | |
|---|---|
| 100% by weight | of polyethylene terephthalate RT 49 (Hoechst AG) having an SV of 800 |
| Outer layer A: | |
| 50% by weight | of polyethylene naphthalate: Polyclear N 100 prepolymer (Hoechst AG) having an SV of 1000 |
| 50% by weight | of polyethylene terephtalate RT 49 (Hoechst AG) having an SV of 800 |
| Outer layer C: | |
| 80% by weight | of polyethylene terephtalate RT 49 (Hoechst AG) having an SV of 800 |
| 20% by weight | of master batch made from 99.0% by weight of polyethylene terephtalate and 1.0% by weight of $SiO_2$ (Sylobloc 44 H), 50% of which had a mean particle size of 2.5 μm and 50% a mean particle size of 1.0 μm |

The process conditions for all layers were as in Example 4.

EXAMPLE 11

A coextruded film was produced similarly to Example 4, but coextrusion was used to produce a two-layer AB film having a total thickness of 12 μm, the heat-sealable layer A having a thickness of 1.5 μm.

| Base layer B: | |
|---|---|
| 80% by weight | of polyethylene terephthatate RT 49 (Hoechst AG) having an SV of 800 |
| 20% by weight | of master batch made from 99.0% by weight of polyethylene terephtalate and 1.0% by weight of $SiO_2$ (Sylobloc 44 H), 50% of which had a mean particle size of 2.5 μm and 50% a mean particle size of 1.0 μm |
| Outer layer A: | |
| 50% by weight | of polyethylene naphthalate: Polyclear N 100 prepolymer (Hoechst AG) having SV of 1000 |
| 40% by weight | of polyethylene terephtalate RT 49 (Hoechst AG) having an SV of 800 |

-continued

| | |
|---|---|
| 10% by weight | of master batch made from 99.0% by weight of polyethylene terephthalate and 1.0% by weight of SiO$_2$ (Syloblock 44 H), having a mean particle size of 1.0 μm |

The process conditions for all layers were as in Example 4.

COMPARATIVE EXAMPLE 1

A film was produced as in Example 10. A copolyester made from 82% by weight of ethylene terephthalate and 18% by weight of ethylene isophthalate was used here for the heat-sealable layer A.

The film was heat-sealable. The film properties are given in Table 2.

COMPARATIVE EXAMPLE 2

A laminate of PET film and PE film was produced. The laminate was heat-sealable. The properties of the laminate are given in Table 2.

COMPARATIVE EXAMPLE 3

A PET monofilm was produced. The composition of the film was:

| | |
|---|---|
| 80% by weight | of polyethylene terephthalate RT 49 (Hoechst AG) having an SV of 800 |
| 20% by weight | of master batch made from 99.0% by weight of polyethylene terephthalate and 1.0% by weight of SiO$_2$ (Sylobloc 44 H), 50% of which had a mean particle size of 2.5 μm and 50% a mean particle size of 1.0 μm |

The film was not heat-sealable. The film properties are given in Table 1.

COMPARATIVE EXAMPLE 4

A PEN monofilm was produced. The composition of the film was:

| | |
|---|---|
| 80% by weight | of polyethylene 2,6-naphthalate: Polyclear N 100 prepolymer (Hoechst AG) having SV of 1000 |
| 20% by weight | of master batch made from 99.0% by weight of polyethylene 2,6-naphthalate and 1.0% by weight of SiO$_2$ (Sylobloc 44 H), 50% of which had a mean particle size of 2.5 μm and 50% a mean particle size of 1.0 μm |

The film was not heat-sealable. The film properties are given in Table 1.

TABLE 1

| Example | Ethylene 2,6-naphthalate units in the outer layer (% by weight) | Ethylene terephthalate units in the outer layer (% by weight) | Ethylene isophthalate units in the outer layer (% by weight) | $T_g1$ | $T_g2$ | Heat-sealable |
|---|---|---|---|---|---|---|
| Example 4 | 50 | 50 | 0 | 93 | 85 | yes |
| Example 5 | 70 | 30 | 0 | 97 | 82.5 | yes |
| Example 6 | 10 | 90 | 0 | 100 | 88 | yes |
| Comparative Example 1 | 0 | 82 | 18 | 81 | 77 | yes |
| Comparative Example 3 | 0 | 100 | 0 | 106 | 80 | no |
| Comparative Example 4 | 100 | 0 | 0 | about 130* | 118 | no |

TABLE 2

| Example | Film thickness μm | Heat-sealable layer thickness μm | Film construction | Minimum sealing temperature °C. A/A | Minimum sealing temperature °C. A/C | Seal seam strength N/15 mm A/A | Seal seam strength N/15 mm A/C | Gloss (60° angle of measurement) Side A | Gloss (60° angle of measurement) Side C | Haze | Reliability in production and further processing | Product ion costs |
|---|---|---|---|---|---|---|---|---|---|---|---|---|
| Example 4 | 12 | 1.2 | ABA | 110 | 110 | 2.5 | 2.5 | 175 | 175 | 2.5 | ++ | ++ |
| Example 7 | 12 | 1.2 | ABA | 108 | 108 | 2.7 | 2.7 | 174 | 175 | 2.6 | ++ | ++ |
| Example 8 | 12 | 1.2 | ABA | 107 | 108 | 2.9 | 2.8 | 176 | 175 | 2.5 | ++ | ++ |
| Example 9 | 19 | 2.0 | ABA | 108 | 108 | 3.7 | 3.8 | 172 | 175 | 2.8 | ++ | ++ |
| Example 10 | 12 | 2.0 | ABC | 110 | 125 | 2.5 | 2.0 | 175 | 178 | 1.4 | ++ | ++ |
| Example 11 | 12 | 1.5 | AB | 109 | 125 | 2.5 | 2.1 | 175 | 178 | 1.5 | ++ | ++ |
| Comparative Example 1 | 12 | 1.2 | AB | 120 | 129 | 2.0 | 2.0 | 145 | 160 | 3.0 | − | + |
| Comparative Example 2 | 24 | 12 | AB | 100 | — | 3.5 | — | 120 | 150 | 6.5 | − | − |

Key for processing reliability and production costs:
++: no tendency to stick to rolls, no blocking problems during use on packaging macines; low production costs
+: moderate production costs
−: tendencey to stick to rolls, blocking problems during use on packaging machines; high production costs
*Glass transition $T_g1$ discernible only with great difficulty, since very small

What is claimed is:

1. A coextruded heat-sealable polyester film having at least one polyester base layer and at least one heat-sealable outer layer, wherein said heat-sealable outer layer comprises a copolymer which contains from 5 to 95% by weight of ethylene 2,6-naphthalate units.

2. A polyester film as claimed in claim 1, wherein said heat-sealable outer layer(s) contain(s) from 10 to 90% by weight of polyethylene 2,6-naphthalate copolymer.

3. A polyester film as claimed in claim 1, wherein the glass transition temperature of the polymer of the heat-sealable outer layer is at least 2° C. higher than the glass transition temperature of the polyester of the base layer.

4. A polyester film as claimed in claim 1, wherein the film has a sealing initiation temperature of below 120° C.

5. A polyester film as claimed in claim 1, wherein the heat-sealable outer layer is arranged on both sides of the base layer.

6. A polyester film as claimed in claim 1, wherein the heat-sealable layer has a thickness of from 0.2 to 5 $\mu$m.

7. A polyester film as claimed in claim 1, wherein a non-heat-sealable outer layer is located on one side of the base layer.

8. A polyester film as claimed in claim 1, wherein the copolymer of the heat-sealable outer layer contains ethylene terephthalate units.

9. A polyester film as claimed in claim 1, wherein the copolymer of the heat-sealable outer layer comprises predominantly ethylene 2,6-naphthalate units and ethylene terephthalate units.

10. A polyester film as claimed in claim 9, wherein the weight ratio of ethylene 2,6-naphthalate units to ethylene terephthalate units is from 5:95 to 95:5.

11. A polyester film as claimed in claim 1, wherein the film has been coated in-line.

12. A polyester film as claimed in claim 1, wherein the film has been corona-treated.

13. A polyester film as claimed in claim 1, wherein the film has been metallized.

14. A polyester film as claimed in claim 1, wherein the film has been printed.

15. A process for producing a heat-sealable polyester film as claimed in claim 1, which comprises coextruding at least one copolymer containing polyethylene 2,6-naphthalate and a polyester through a flat film die onto a chill roll, where they are cooled, and then monoaxially or biaxially orienting the resultant semifinished film, after which the film is heat-set and finally wound up.

16. The process as claimed in claim 15, wherein the copolymer is prepared by transesterification in the extruder which compresses and plasticizes the copolymer and feeds it to the flat film die.

17. A coextruded heat-sealable polyester film having at least one polyester base layer and at least one heat-sealable outer layer, wherein the polymer of the heat-sealable outer layer has a glass transition temperature which is the same as or higher than the glass transition temperature of the polyester of the base layer.

* * * * *